United States Patent Office 3,453,872
Patented July 8, 1969

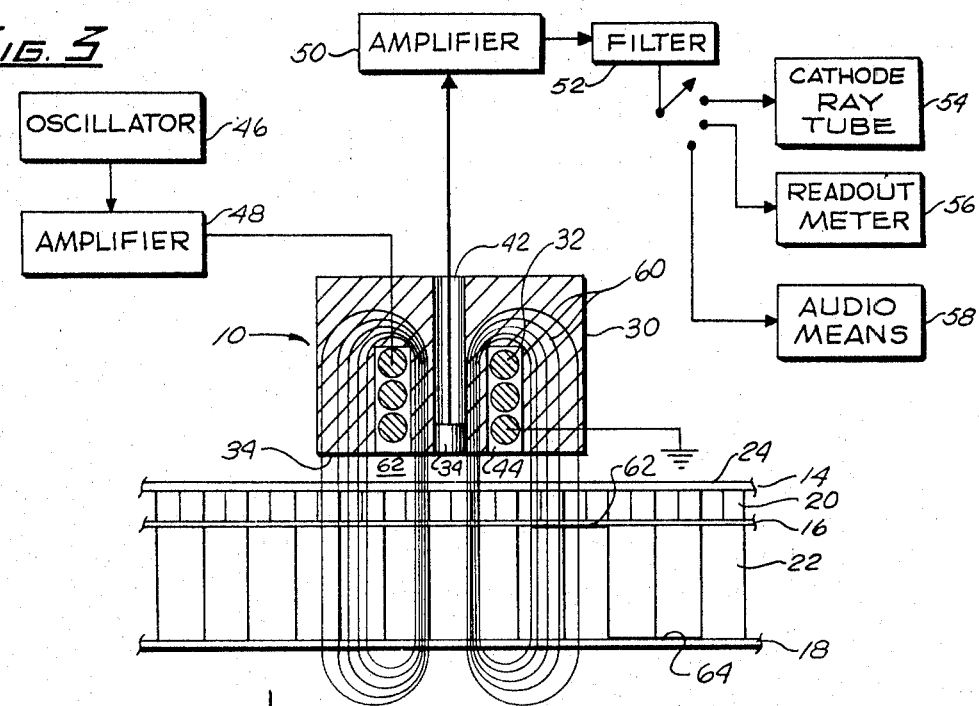
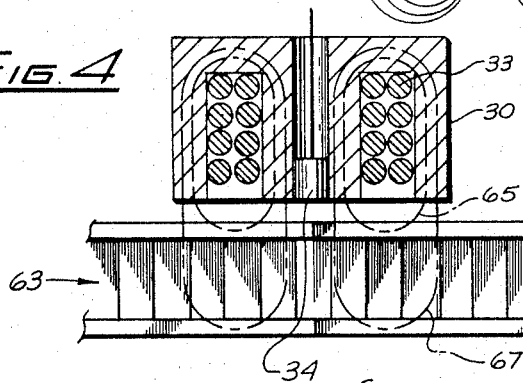
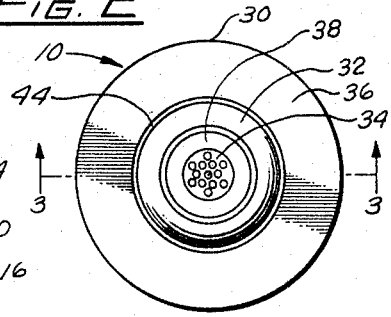
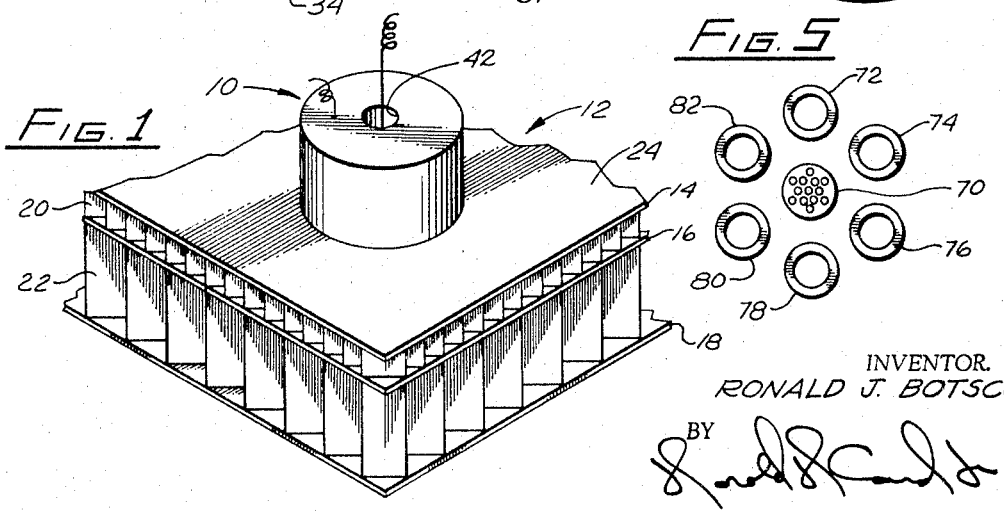

3,453,872
EDDY SONIC INSPECTION METHOD
Ronald J. Botsco, Los Angeles, Calif., assignor to North American Rockwell Corporation, a corporation of Delaware
Filed Mar. 24, 1966, Ser. No. 537,088
Int. Cl. G01n 29/04
U.S. Cl. 73—69    5 Claims

ABSTRACT OF THE DISCLOSURE

Composite workpieces such as lightweight panels of sandwich-type construction are inspected by progressively exposing one surface of the panel to a fluctuating magnetic field which penetrates through the panel. The field originates from a movable probe having a microphone therein, so that defects in the panel which cause acoustical variations are sensed by the microphone and observed by suitable display means.

---

This invention concerns a method for analyzing certain properties of materials by use of mechanical vibration or stress waves capable of producing sound. More particularly, this invention comprises a method for generating eddy-currents to produce informative acoustic emittance from a workpiece to discern or identify structural properties thereof, including stress patterns, strength, and defects. Primarily, the invention has its widest application both in discerning and identifying subsurface configuration and in locating defects in solids or other structures, especially composite articles and articles of hollow construction, particularly those situated so as to permit direct access to only a limited portion of the external surface of such articles.

A particular need for this invention exists in connection with the fabrication and use of composite articles such as laminates as well as complex, thin-walled articles and the like, of which lightweight panels of sandwich type construction widely used in the fabrication of modern high-speed aerial and space vehicles are typical. Accordingly, while the invention has utility for a wide variety of diverse purposes and with different materials and structural configurations, it will be described for the sake of illustration in connection with inspection of structural panels of the foregoing type.

Panels of the stated type typically comprise a pair of spaced-apart face sheets joined to a low density core such as steel or plastic honeycomb material having a cell wall thickness as little as .001 inch. The face sheets are joined to the core material on either side thereof by methods of joinder which depend upon the materials involved, and in the case of metals may include diffusion bonding, welding, brazing, or adhesives. In addition, composite structures of panel type often comprise both metallic and non-metallic components, including core materials of different configuration bonded to intermediate layers of metal, fibrous composition, cork, ceramic, or plastic.

Use of such panels in modern aerial and space vehicles requires the utmost structural integrity in the completed panel, since they may comprise highly stressed portions or heat, impact or pressure barriers of the airframe or vehicle structure to which they are secured. Thus, uniformly strong and reliable joints between laminae and between the face sheets and adjoining core material are essential, and detection of any defects which may exist in joints formed between panel components is commensurately vital. To this end, careful and complete inspection of such panels is often required to insure the quality and over-all integrity of every component, not only at the time of initial fabrication, and periodically during storage or shipment, but before every flight of the vehicle or missile upon which such items are mounted.

Where panels of the type discussed above are installed by welding, there is an unavoidable risk of damage to the panel joints and other deleterious effects in the base metal due to collateral effects of welding heat. The absence of these effects must be determined with certainty before the vehicle which incorporates such panels is permitted to perform its intended function. Where a panel is fully installed and permanently joined to adjacent structure in a vehicle, and access to only one side of the panel is permitted due to structural interference from surrounding vehicle components, inspection of panels is extremely difficult and cannot be done with normal techniques known to the prior art and which involve immersion or otherwise require complete access to both sides of the article sought to be inspected. Moreover, where a disbond exists deeply within the panel and not close to the surface to which access is permitted, location and identification of the defect cannot usually be discerned by such well known inspection methods as X-ray devices or the like.

The invention in this case involves nondestructive testing and inspection of multi-walled and otherwise lightweight laminated or other hollow structures by analyzing the testing of structures such as described hereinabove, no in respect of its acoustic emission caused by eddy-current excitation. The eddy-current pattern and acoustical behavior of composite structure is mathematically complex and virtually unpredictable by theoretical analysis, because of their structural geometry and variations of material composition, densification and mass distribution. Conventional ultrasonic methods, especially involving pulsating signals, are of extremely limited capability in regard to the testing of structures such as described hereinabove, notably of composite construction and non-uniform materials, particularly non-metallic materials and especially when access is limited to one surface of the structure. Complicated reverberations, interference, mode conversions, and excessive attenuation, especially at or above the high kilohertz range, are major factors which render most of the well known ultrasonic types of test unsuitable in this regard. Thus, when a composite, such as adhesive-bonded honeycomb sandwich type panel, is impedance tested at high frequencies, adequate energy translation is seriously hindered by the mentioned factors. Since acoustic impedance affects both the energy input and the energy output, the sensitivity of the pure acoustic (i.e. pulse-echo) test is severely compromised by losses as much as 90% of energy input whereby the output represents only a 10% efficiency in signal transmission achieved in such workpieces. Also, the material characteristics often prohibit satisfactory formation of a standing wave at high frequencies throughout the composite with the reuslt that the test reveals only the bonding characteristics between interfaces nearest to and closely proximate the standing wave source. In the case of highly attenuated laminars such as bonded cork, glass filament or rubber layers, sound energy normally cannot propagate through to the bond interface. When a sound wave is not reflected from the bonded interface, no change of wave characteristic between a good or a poor bond is obtainable, and other means for testing the bond are necessary. Conventional ultrasonic instruments known to the prior art thus are generally capable of testing only surfaces but not masses in depth with regard to composite workpieces of the stated type, especially panels of substantial thickness such as ½ inch or more, for example. It is also a major disadvantage of all conventional ultrasonic tests that a liquid couplant is required between a probe and the workpiece surface. Thus, a workpiece which is too large to be conveniently immersed in liquid or which is otherwise sensitive to liquids, cannot be inspected by usual ultrasonic methods.

Accordingly, it is a principal object of the invention in this case to provide a method to inspect structures, especially composite structures, progressively throughout their entire mass.

It is another object in this case to provide a method as set forth in the above objects using an air couplant and not requiring a liquid couplant between the inspection probe and the workpiece surface.

It is an additional object in this case to provide a method as set forth in the above objects characterized by higher sensitivity permitting accurate depth or spacial location and area definition of defects or structural discrepancies within composite structures, especially at joints between individual elements of such composite structures.

It is also an object in this case to provide a method as set forth in the above objects having improved versatility permitting nondestructive testing of the entire thickness of panel-like parts permanently installed within surrounding structure and requiring access to one side only.

Other objects and advantages will become apparent upon a close reading of the following detailed description of an illustrative embodiment of the inventive concept, reference being had to the accompanying drawings, wherein:

FIGURE 1 shows the general perspective view of an illustrative embodiment of the inventive probe in this case operatively related with a workpiece during inspection thereof, FIGURE 2 shows a plan view of an end of the probe from FIGURE 1, FIGURE 3 shows a cross-sectional view of the structure shown in FIGURE 1 with the addition of circuit components operatively related to the probe and shown in block form, FIGURE 4 is a view similar to FIGURE 3 but with different test structure, and FIGURE 5 is a plan view of a modification of the structure of FIGURE 2.

With reference to the drawings described above, and particularly to FIGURE 1, the invention disclosed herein may be seen to include magnetic field producing and acoustical sensing means which may illustratively take the form of probe 10. Probe 10 is generally cylindrical in shape and is adapted to contact or be suspended above a surface of the specimen or workpiece which is sought to be inspected as illustrated by the panel generally designated by reference numeral 12 in FIGURE 1.

Workpiece 12 illustratively comprises a plurality of spaced-apart relatively thin sheets 14, 16 and 18 having relatively low density core material such as honeycomb core sections 20 and 22 sandwiched therebetween in the manner shown by FIGURE 1. Core section 20 may illustratively comprise metallic material such as aluminum or steel, while core section 22 may be either metallic or non-metallic such as reinforced paper, plastic or ceramic material. Any of sheets 14, 16 or 18 may be metallic or non-metallic, although the actual test procedures and interpretation of test results may differ slightly depending upon which of the stated sheets is metallic or especially if none of the sheets is metallic. The inventive concept in this case is particularly suited to the inspection of workpiece 12 to determine the structural integrity thereof throughout its total thickness and especially at the critical planes defined by the joints between core sections 20 and 22 where they are bonded or otherwise secured to sheets 14, 16 and 18 on either side thereof.

Referring to FIGURE 2, it may be seen that the end of probe 10 which is adapted to contact or nearly contact the upper surface 24 of workpiece 12 comprises at least one bearing surface and preferably two substantially concentric and spaced-apart substantially planar bearing surfaces 36 and 38 which are separated by an annular gap formed by a cavity 44 containing helical coil 32. At the center of the circle defined by bearing surface 38 is situated a vibration or acoustical sensing or monitoring means 34 which may illustratively comprise such acoustical responsive means as a microphone, accelerometer, or other electro-acoustical transducer pick-up element.

Referring to FIGURE 3, it may be seen that a majority of the flux-focusing and intensifying mass comprising probe 10 consists of magnetic flux transmitting material 30 which is of any suitable material capable of transmitting magnetic flux with maximum efficiency and minimum loss, such as a ferrite cup or silicon-iron or steel and which may, if desired, be formed by a plurality of laminations in the familiar manner of magnetic cores used in field windings and the like or may be cast in a dielectric matrix as used in computer memory circuits. Flux-focusing mass 30 is substantially a solid mass of high magnetic permeability material and of generally cylindrical shape having an aperture or hole 42 axially situated on the longitudinal axis of the stated cylinder. Moreover, the annular cavity mentioned above and designated by reference numeral 44 in FIGURE 3 extends from one end of mass 30 in a longitudinal direction, terminating at a location intermediate the two extremities of the cylinder defined by mass 30. The depth of generally cylindrical cavity 44 is required to be only as required to accommodate coil 32 which is contained therein, and the size and capacity of which will be dictated more or less by the shape, configuration, materials and mass distribution in the workpiece which is sought to be inspected by means of probe 10. A power source connected to coil 32 for electrically energizing the same may take any suitable form such as signal generator 46 which supplies an alternating, pulsating, white (random) noise or otherwise nonuniform current to the coil through amplifier 48.

Vibration signal monitoring and readout means are connected with electro-acoustical transducer 34 and may take the form of amplifier 50, filter 52, where desirable, and suitable information display means such as cathode ray tube 54, meter 56, spectrum analyzer, or audio means 58, any one or all of which may be used as suggested by FIGURE 3. However, it will be understood that any suitable data recording and analyzing or indicating means capable of receiving a sound or vibration signal electrically from element 34, either with visual or recording devices, may be used instead of the foregoing items 50 through 58. Moreover, an electrical pulse may be used to create the necessary vibration of the workpiece. Phase, frequency, filtering, modulation as well as amplitude analysis of detected signal may be adapted to practice the inventive process disclosed herein.

*Operation*

Although the apparatus disclosed herein may be used for a variety of diverse materials, workpieces, and for different purposes, its operation need not in any case differ materially from that described below for the sake of illustration. Initially, it may be assumed that panel 12 is permanently affixed or otherwise installed in a vehicle or other structure which prevents access to the external surfaces of both face sheets 14 and 18, whereby access is limited only to upper face sheet 14. With the circuit components connected generally as suggested by the schematic showing of FIGURE 3, probe 10 is positioned either in contact or in close proximity to surface 24 of the workpiece and the electrical signal source 46 is energized. It is a significant advantage of the inventive apparatus in the case that probe 10 requires no liquid coupling between the probe and the workpiece surface with respect to which the probe is operatively related during the inspection, whereby an air coupling is adequate in this regard, shown by gap 66.

Initiating of a discontinuous electrical signal hereinafter called the primary current from source 46 through amplifier 48 energizes coil 32 which produces a primary magnetic field in accordance with well known electromagnetic principles identified with coils. The direction of flux lines in the stated field will depend upon the direction of primary electrical current energizing coil 32, and use of alternating current from source 46 will produce periodic reversal in the direction of flux lines 60 of the primary field with a frequency corresponding to the cyclic changes of current direction. However, the location of the flux field will continue to conform generally with that suggested by lines 60 in FIGURE 3 by reason of the fact that mass 30 is made of materials having very high magnetic permeability whereby most of the flux field will be concentrated and hence focused along a path through mass 30 and generally not through surrounding atmosphere or through aperture 42.

The primary magnetic field defined by flux lines 60 is constantly expanding and collapsing as well as reversing its direction or polarity where the primary energizing signal for coil 32 is alternating current. It will be understood that this movement of the magnetic field relative to stationary workpiece 12 will in turn produce secondary electrical currents in those components of the workpiece situated within the stated field which are metallic or otherwise electrically conductive. The electrical currents thus induced will eddy and otherwise have non-uniform direction and intensity due to the shape and material of the workpiece constituent elements and further due to lack of uniformity in the primary magnetic field direction and intensity. The foregoing eddy-currents will also produce a secondary magnetic field which is not pictured in FIGURE 3 but which generally opposes or otherwise interferes with the force and direction of the primary magnetic field defined by flux lines 60. The total magnetic force produced by the foregoing non-uniform primary and secondary magnetic fields, produces a mechanical force which varies continually in intensity and direction, and at a rate which is affected by the characteristics of the input signal and which is not necessarily in the audio range. As a result of the stated mechanical force, stress waves or acoustical vibrations are produced in and emitted from the total workpiece originating initially with these components which carry eddy-currents. These acoustical vibrations will have certain characteristic amplitudes, cause an acoustic emission which is characteristic of the total workpiece thickness in the tested area. The foregoing vibrations will have certain characteristics amplitudes, phasing, and frequency spectra which are substantially (but not necessarily absolutely) uniform throughout each particular workpiece wherever no defects or non-uniformities of workpiece structure, configuration or composition exist. However, where disbonds or defective joints such as indicated by reference numerals 62 and 64 in FIGURE 3 occur in workpiece 12, the effect of any such defect is to alter the vibration characteristics of the workpiece in the area of the defect so that a definite change occurs in the total sound or characteristic vibration properties of the workpiece in the stated area. The foregoing change may be slight or may be drastic, but is generally always definite and discernible by various sound-sensitive means including many known to the prior art. The precise changes of total acoustic emission obtained at each tested area may be screened or analyzed qualitatively to determine the depth of the defect relative to the total workpiece thickness. In the present case, the vibration sensing means comprise microphone element 34 which may take any of numerous forms familiar to those skilled in the field of vibration or sonics. Microphone element 34 continuously senses or monitors the sound or general vibration pattern resulting from the actuation of probe 10 in the manner described above and, through such conventional devices as amplifier 50 and filter 52, provides visual or other data detection means with a continuous reading or record of changes in the characteristic sound or vibration pattern produced in and emitted from workpiece 12 during actuation of probe 10. It will further be understood that probe 10, during its continuous actuation in the foregoing manner, is continuously moved in a suitable pattern of movements across surface 24 to scan the entire workpiece, whereby readings for each workpiece location are progressively obtained.

In the event that none of the workpiece elements such as core sections 20, 22 or face sheets 14, 16 or 18 is metallic or electrically conductive, or otherwise responsive magnetic force, it has been found that completely non-metallic workpieces may nonetheless be inspected very effectively by the inventive process disclosed herein when a thin metallic element such as metallic tape or electrically conductive spray coating is secured to a surface of the workpiece opposite from that contacted by probe 10, or other such locations on the workpiece as may be convenient.

Further regarding the materials used in various workpieces which are sought to be inspected by the inventive method disclosed herein, it is pertinent to note that such non-magnetic metals as aluminum and copper, for example, still respond to a moving magnetic field by generating eddy-currents. Such currents will produce non-uniform forces more than sufficient to cause vibration of the aluminum or copper elements in a workpiece. Magnetic materials such as steel, for example, will also have eddy-currents induced by the primary magnetic field and such currents in turn produce the secondary magnetic fields discussed hereinabove. In both cases, the vibration and acoustic emission principles are essentially the same and the method disclosed herein is applicable to both general types of materials. Moreover, materials which are ferromagnetic but cannot conduct electrical current over any perceptible distance are still susceptible to vibration and inspection by the method disclosed herein.

Referring to FIGURE 4, it may be seen that the general shape of the flux field is influenced by the relative location of magnetically responsive elements in the workpiece. Thus, if upper face sheet 14 of a composite sandwich-type panel 63 is metallic or otherwise magnetically responsive, a flux path generally conforming with the line 65 will result from the energization of coil 33. Coil 33 in FIGURE 4 is double wound for the sake of illustration, but functions in the same manner described hereinabove in respect of coil 32 shown in FIGURE 3. If lower face sheet 16 of workpiece 63 is magnetically responsive, a flux path conforming generally with line 67 will result. If only sheet 14 is magnetically responsive, and the remaining workpiece components are not, then substantially all the flux lines emanating from coil 33 and core 30 will pass through sheet 14 and only occasional or random flux force will reach through other portions of the workpiece, whereby line 67 will not represent the path of any significant flux. Similarly, line 65 would not relate in any way to the dominant path of flux if only sheet 16 were magnetically responsive.

FIGURE 5 shows a variation of the methods and means discussed hereinabove without departing from the basic inventive principles thereof. Thus, acoustical sensing element 70 is shown in a view corresponding with FIGURE 5, but having a plurality of vibration inducing means proximate thereto such as coils 72, 74, 76, 78, 80 and 82 which may correspond in shape and function with coil 32 or 33 discussed above. By sequential energization of the several coils 72–82 in a desired pattern and at a suitable rate, the relative location of disbonds or other defective joints in a workpiece may be detected more conveniently than by moving probe 10 around a surface in a given case.

With further regard to the location of defects in a composite workpiece by the apparatus and process disclosed herein, it has been found that resonant frequencies as between the probe and the workpiece in any particular case is not essential. However, some frequencies in the excitation signal to coil 32 in FIGURE 3, for example, produce greater sensitivity in certain layers of a composite workpiece than other layers or laying surfaces in the same workpiece, whereby variations of frequency in the stated regard can sometimes provide a useful approach in discerning the depth of a disbond or other defect within the total thickness of an article.

I claim:

1. In a method for nondestructively inspecting a composite article having at least one joint between two component elements of said composite article:

placing an electro-magnetic source of flux closely proximate a surface of one of said elements of said article, energizing said source with an electrical signal adapted to create a flux field of changing intensity and of sufficient strength to penetrate through said joint in said article and to cause vibration of said elements, at least the other of said elements being metallic, sensing said vibration of said elements at a plurality of locations over said surface, at least one of said locations being in a substantially defect-free portion of said article, and comparing said sensed vibrations at said plurality of locations with the vibrations obtained at said one location to determine the existence of differences therebetween.

2. The method set forth in claim 1 above, including;
varying the frequency of said initiating signal over a range of frequencies at each of said locations.

3. In a method for nondestructively inspecting a composite article having at least one joint between two component elements of said composite article, said elements being non-responsive to magnetic flux, the steps of:

securing to said article at least one magnetically responsive layer, placing an electromagnetic source of flux closely proximate a surface of said article spaced-apart from said layer, energizing said source with an electrical signal adapted to create a flux field of changing intensity and of sufficient strength to penetrate through said article and said layer and to cause vibration of said elements, sensing said vibration of said elements at a plurality of locations over said article, at least one of said locations being in a substantially defect-free portion of said article, and comparing said sensed vibrations at said plurality of locations with the vibrations obtained at sai done location to determine the existence of differences therebetween.

4. In a method of inspecting an article having at least one magnetically responsive element therein to determine the structural integrity of said article:

placing a plurality of electro-magnetic sources of flux closely proximate an external surface of said article, arranging said sources of flux generally symmetrically about an acoustically responsive scensor.

sequentially energizing said source of flux by electrical signals of changing intensity adapted to create said flux in fields of changing intensity to induce vibration in said article, said fields penetrating through said one element, observing said vibrations separately caused by each of said sources of flux as sensed by said acoustically responsive sensor, and comparing said sensed vibrations to determine the presence of defects in said article by difference between said sensed vibrations.

5. In a method of inspecting an article having non-magnetically responsive elements forming the same, the steps of:

securing to said article at least one magnetically responsive layer, placing a plurality of electro-magnetic sources of flux closely proximate an external surface of said article, arranging said sources of flux generally symmetrically about an acoustically responsive sensor, sequentially energizing said sources of flux by electrical signals of changing intensity adapted to create said flux in fields of changing intensity to induce vibration in said article, said fields penetrating through at least said layer, observing said vibrations separately caused by each of said sources of flux as sensed by said acoustically responsive sensor, and comparing said sensed vibrations to determine the presence of defects in said article by differences between said sensed vibrations.

References Cited

UNITED STATES PATENTS

| | | | |
|---|---|---|---|
| 445,860 | 2/1891 | De Place | 73—69 |
| 1,990,085 | 2/1935 | Mudge et al. | 73—67.2 |
| 2,320,390 | 6/1943 | Shmurak | 73—67.2 XR |
| 2,403,999 | 7/1946 | Read et al. | 73—67.2 |
| 2,752,781 | 7/1956 | Thorsen | 73—69 XR |
| 2,851,876 | 9/1958 | Arnold | 73—67.1 |
| 3,038,329 | 6/1962 | Miller | 73—69 |

FOREIGN PATENTS 969,515   9/1964   Great Britain.

RICHARD C. QUEISSER, *Primary Examiner.*

J. P. BEAUCHAMP, *Assistant Examiner.*